United States Patent [19]

Mosley, Jr.

[11] 4,398,733
[45] Aug. 16, 1983

[54] JAWED, LATHE CHUCK

[76] Inventor: Thomas C. Mosley, Jr., 8628 E. Granada Rd., Scottsdale, Ariz. 85257

[21] Appl. No.: 263,130

[22] Filed: May 13, 1981

[51] Int. Cl.³ ..................... B23B 31/12; B23B 31/40
[52] U.S. Cl. ........................... 279/1 TE; 279/2 R; 279/33; 279/114
[58] Field of Search ............... 279/1 DA, 1 TE, 2 R, 279/33, 34, 106, 114

[56] References Cited

U.S. PATENT DOCUMENTS

| | | | |
|---|---|---|---|
| 222,056 | 11/1879 | Kirkham | 279/33 |
| 1,187,920 | 6/1916 | Muller | 279/106 |
| 1,391,441 | 9/1921 | Williamson | 279/34 |
| 1,429,396 | 9/1922 | Barker | 279/114 |
| 2,264,589 | 12/1941 | Rydquist | 279/2 R |
| 2,528,873 | 11/1950 | Dorman | 279/33 X |
| 2,588,938 | 3/1952 | Rogers | 279/114 |
| 2,593,706 | 4/1952 | von Zelewsky | 279/33 |
| 2,916,290 | 12/1959 | Skillin | 279/106 |
| 3,016,245 | 1/1962 | von Zelewsky | 279/106 |
| 3,995,869 | 12/1976 | Mazingue | 279/33 |

FOREIGN PATENT DOCUMENTS 652571 11/1962 Canada ........................ 279/106

75308 10/1893 Fed. Rep. of Germany ........ 279/34

Primary Examiner—Robert E. Garrett
Assistant Examiner—Steven B. Katz
Attorney, Agent, or Firm—Bernard J. Murphy

[57] ABSTRACT

In the embodiment shown, the chuck comprises a hub rotatably journalled in a jaw carrier, and the latter rotatably journalled in a body. The carrier pivotably mounts a plurality of jaws having camming surfaces, and drive pins upstanding from the hub and the body slidably engage the camming surfaces to move the jaws outwardly, to engage the inner surface of a workpiece, or inwardly, to engage the outer surface of the workpiece. A screw carried in the jaw carrier is movable into the hub, to lock the hub and jaw carrier together, and movable into the body, to lock the body and the jaw carrier together. In the prior circumstance, the drive pins of the body are operative to move the jaws inwardly or outwardly; in the latter circumstance, the pins of the hub are operative to move the jaws as noted above. The jaws have a first plurality of camming surfaces for operative engagement with the drive pins in the body, and a second plurality of camming surfaces for operative engagement with the drive pins in the hub.

19 Claims, 6 Drawing Figures

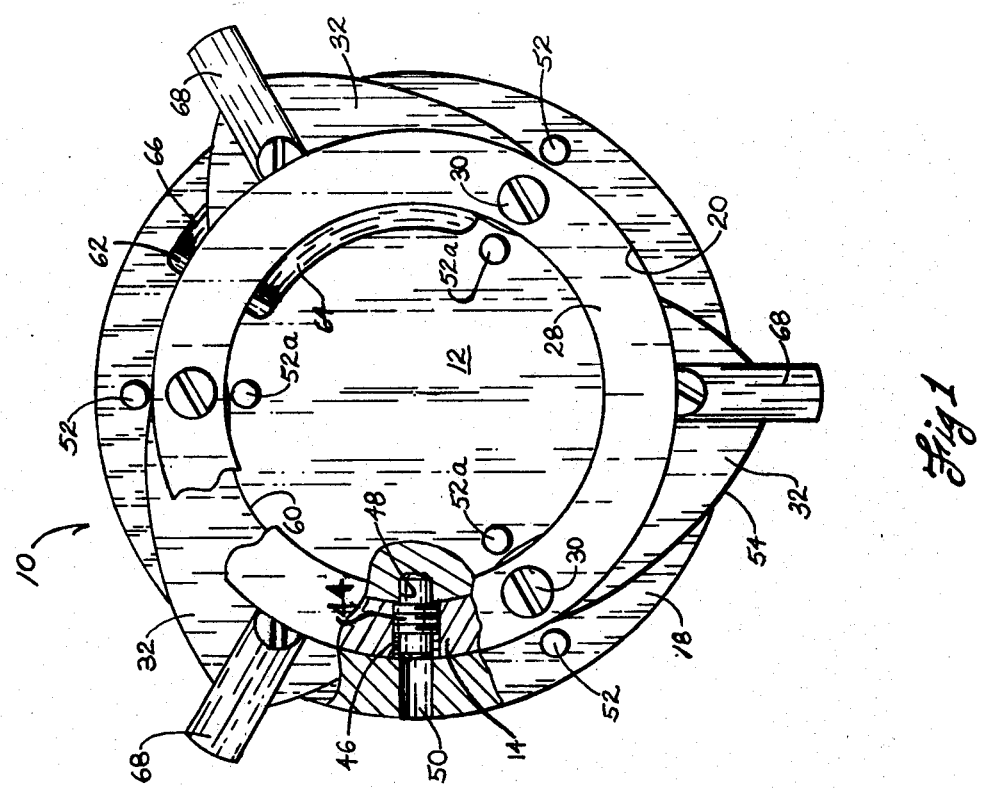
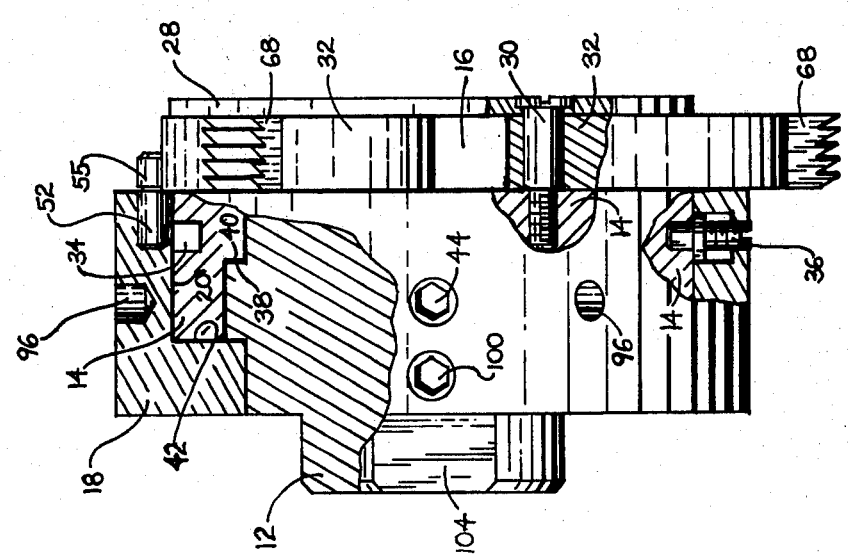

JAWED, LATHE CHUCK

This invention pertains to jawed lathe chucks, and in particular to a jawed lathe chuck having means selectively operative of the jaws thereof both inwardly and outwardly, for engaging the outer surface of a workpiece, or the inner surface of a workpiece.

Jawed lathe chucks having means for adjustably gripping the outer surface of a workpiece are well known in the prior art, as are jawed lathe chucks which have means for adjustably gripping the inner surface of a workpiece. Typical thereof are the Chuck for Holding Polishing Belts, disclosed in U.S. Pat. No. 2,264,589, issued to A. Rydquist, on Dec. 2, 1941, and the Clamping Device for Machine Tools, set forth in U.S. Pat. No. 2,593,706, issued to O. Von Zelewsky, on Apr. 22, 1952.

Jawed lathe chucks, such as the foregoing, which operate "outwardly" cannot function in the alternative direction, as the operative structure is centrally disposed; "inward" gripping therefor cannot be accommodated. Likewise with "inwardly" functioning chucks; the operative structure therefor is outward, or peripheral thereof. Accordingly, such cannot accommodate expanding jaws. In view of this, when a workpiece has had to be gripped inwardly thereof, it has been necessary to use an "outwardly" expanding chuck. When a workpiece has had to be gripped externally, it has been necessary to use an "inwardly" expanding chuck.

What has been needed is a jawed, lathe chuck of universal application and functioning, having means for gripping a workpiece either externally or internally with a minimum of adjustment to the selfsame, one chuck.

It is an object of this invention to set forth just such a universal chuck.

It is particularly an object of this invention to disclose a jawed, lathe chuck comprising a hub; a jaw carrier, having a plurality of equally-spaced apart jaws pivotably coupled thereto; and a chuck body; wherein said hub is journalled in said jaw carrier for accommodating relative rotation between said hub and said jaw carrier; and said jaw carrier is journalled in said body for accommodating relative rotation between said jaw carrier and said body; and further including means carried by said hub, and engageable with said jaws, for causing said jaws to pivot, upon said hub and jaw carrier executing relative rotation therebetween; means carried by said body, and engageable with said jaws, for causing said jaws to pivot, upon said jaw carrier and said body executing relative rotation therebetween; and means mounted in said jaw carrier, and engageable with said hub and said body, selectively operative in a first mode for prohibiting relative rotation between said hub and said jaw carrier, and selectively operative in a second mode for prohibiting relative rotation between said jaw carrier and said body.

Further objects of this invention, as well as the novel features thereof, will become more apparent by reference to the following description, taken in conjunction with the accompanying figures, in which:

FIG. 1 is a front elevational view of the novel jawed, lathe chuck, according to an embodiment thereof;

FIG. 2 is a side, elevational view, partially cut-away, of the chuck;

Figure 3:
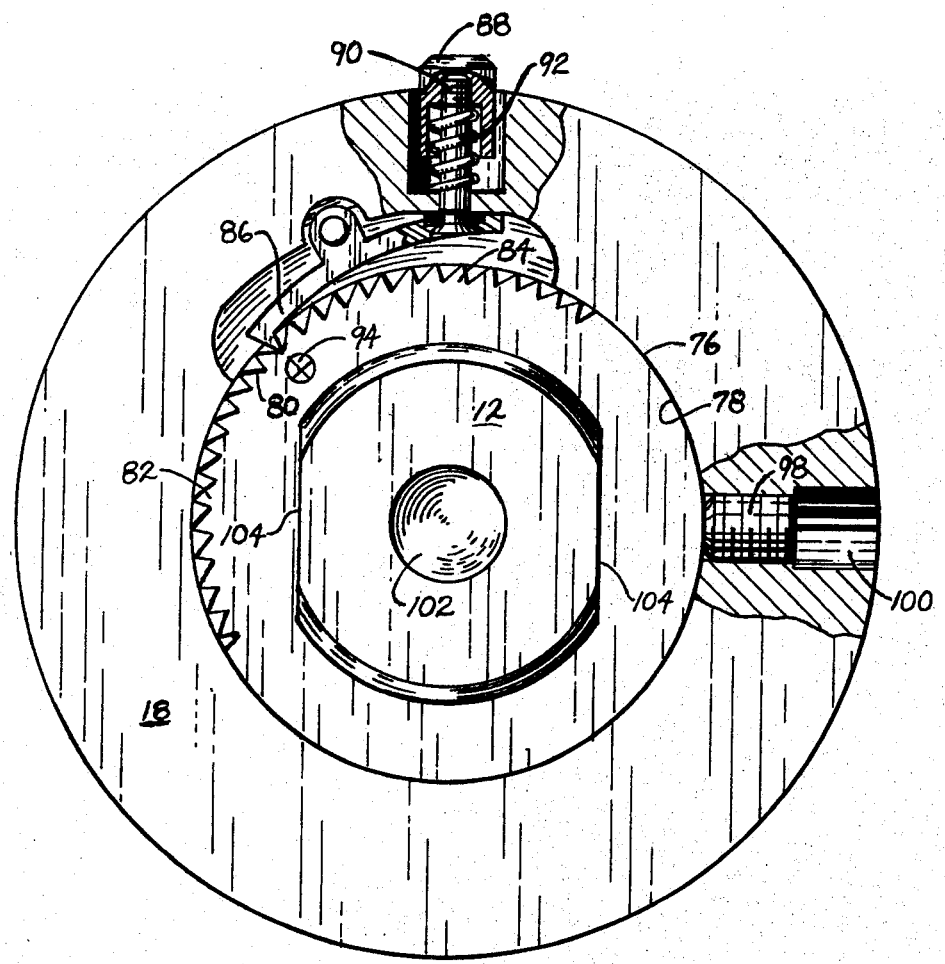
FIG. 3 is a rear elevational view thereof, also partially cut-away to show ratcheting details.

As shown in the figures, a jawed, lathe chuck 10, according to an embodiment thereof, comprises a hub 12 which is rotatably journalled in a jaw carrier 14, the latter having a centrally-disposed void 16, in which to receive the hub 12. In turn, the jaw carrier 14 is rotatably journalled in a chuck body 18, the latter having a central aperture 20 in which to receive the jaw carrier. A separable annulus 28 is mounted at the top. Fasteners 30 are passed through the annulus 28 and through pivot holes in jaws 32, to fix the annulus in place and pivotably to secure the jaws 32 to the jaw carrier 14.

The jaw carrier 14 has a circumferential groove 34 formed therein, and retaining screws 36, threaded into the body and projecting therefrom into the groove, retain the jaw carrier in rotatable engagement with the body 18. By withdrawing the screws 36, the body 18 and jaw carrier 14 may be separated—depending upon the disposition of a function set screw (of which more is explained in the ensuing text).

The hub 12 has an external, circumferential land 38 which nests upon a shoulder 40 formed within the void 16 of the jaw carrier 14. With the hub thus nested, for relative rotation with the jaw carrier 14, and the latter rotatably captive in the body 18 (by means of the screws 36), the land 38 also nests upon a shoulder 42 which extends inwardly from the aperture 20. In this manner, the hub 12, jaw carrier 14, and body 18 are operatively coupled together into a single unit.

A function set screw 44 is threadedly disposed in a threaded bore therefor in the jaw carrier 14. The screw 44 has a length greater than that of the bore 46 in which it is disposed. Therefore, either the inner end thereof, or the outer end thereof, must intrude into the hub 12 or the body 18. Now, the hub 12 has a short hole 48 formed therein, in the outer surface thereof which interfaces with the jaw carrier 14. By rotating the hub and jaw carrier, relatively, the hole 48 can be aligned with the bore 46. When such alignment is effected, the screw 44 can be turned until the inner end thereof has entered the hole 48. Upon this being done, the hub 12 and the jaw carrier 14 are locked together and can not execute relative rotation therebetween.

The body 18 has a hole 50 formed therein and fully through from the outer surface thereof to an inner surface thereof which defines an interface with the jaw carrier 14. By rotating the body 18 and the jaw carrier 14, relatively, the hole 50 can be aligned with the hole 46. When this alignment is effected, the screw 44 can be turned until the outer end thereof has entered the hole 50. Upon this being done, the body 18 and the jaw carrier 14 are locked together and can not execute relative rotation therebetween. Accordingly, by aligning the hole 48, bore 46 and hole 50, and threadedly moving the function set screw either inwardly or outwardly, the body 18 or the hub 12 can be made to cause the jaws to pivot.

Figure 5:
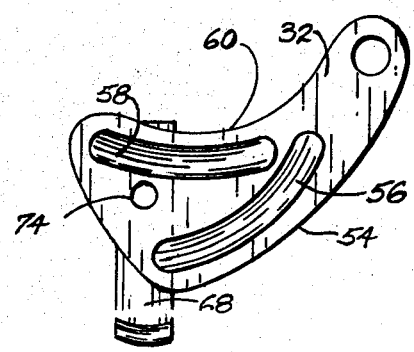

The body 18 has a plurality of drive pins 52 upstanding thereon, the pins having rollers 55 captive thereon. With the arrangement shown in FIG. 1, and by causing the jaw carrier 14 to rotate, relative to the body 18, in a clockwise direction, the drive pins 52 will engage the outer camming surfaces 54 of the jaws 32, and cause the latter to move inwardly toward the void 16. As shown in FIG. 5, the jaws have camming grooves 56 and 58 formed therein on the undersides thereof. Simply by removing the screws 36, lifting the jaw carrier 14 from the body, slightly, and setting the drive pins 52 in the grooves 56, and setting the jaw carrier back into the body 18 (with the screws 36 replaced), the jaws can be caused to slue in wide arcs. With the jaw carrier 14 being turned in a counterclockwise direction, and a clockwise direction, relative to the body 18, the jaws 32 swing outwardly and inwardly.

A like functioning proceeds from the use of the drive pins 52a which are upstanding from the hub 12. Again, with reference to FIG. 1, and assuming the jaws 32 to have been pivoted (as by hand) inwardly toward the void 16, the drive pins 52a will function to force them outwardly. With the aforesaid assumed positioning of jaws 32, and the jaw carrier 14 being rotated in a clockwise direction, relative to the hub 12, the drive pins 52a will move contactingly along the inner camming surfaces 60 of the jaws 32, FIG. 5, and cause the latter to move outwardly.

The jaws 32, again, can be made to engage the pins 52a by means of the camming grooves 58, this to effect a greater slue of the jaws, and to bring them considerably inward of the void 16. This is done as follows. The jaw carrier 14 is first separated from the body 12, as mentioned priorly, by removing the screws 36. Then the function set screw 44 is backed out of the hole 48. At this juncture, the hub can be lifted from the jaw carrier 14. Lifting the latter, slightly, will enable the emplacement of the grooves 58 upon the drive pins 52a. Then, the assembly is reassembled. Now, as the jaw carrier 14 is rotated counterclockwise and clockwise, relative to the hub 12, the jaws 32 slue widely inwardly and outwardly relative to the void 16.

Vis-a-vis the hub 12 or the body 18, the jaw carrier 14 rotates through a limited arc. A pin 62 fixed in the jaw carrier 14, and having protruding ends which travel along peripheral recesses 64 and 66 formed in the hub 12 and body 18, respectively, limits the aforesaid rotations to the sweep of the limited arc.

Figure 4:
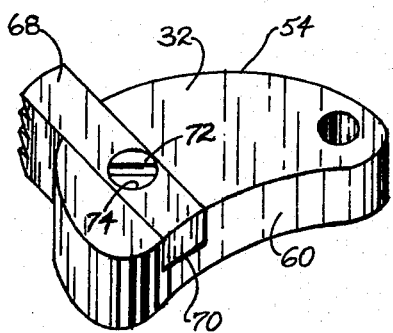
FIGS. 4 and 5 are oblique top and bottom plan views of one of the jaws, with an auxiliary jaw extender in place.

In FIG. 1, the extenders 68 are shown outwardly directed. Now, as FIGS. 4 and 5 evidence, the extenders 68 may be either outwardly or inwardly directed. Each jaw 32 has a transverse slot 70 formed therein which receives the intermediate shank of an extender 68. The jaw 32 has a tapped hole formed therein to receive the extender holding screw 72, the latter being passed through a hole 74 formed therefor in the extender 68. The extender 68 may be fastened to the jaw 32 as shown, or removed, rotated, end-for-end, and fastened to the jaw 32 in the opposite direction.

The novel chuck 10 comprises means for arresting the jaws 32 in selected slues thereof, and this is shown in FIG. 3. A circular extension 76 of the hub 12 rotatably engages the inner land surface 78 of the shoulder 42 of the body 18. Along a peripheral length of the extension 76 is formed a ratcheting surface 80. The surface 80 comprises two series of ratchet teeth; a first series 82 has the teeth oriented in a direction opposite to that of the second series 84. The surface 80 is engaged by a rachet pawl 86, and the latter is spring-loaded into engagement with the surface 80, and selectively released therefrom, by means of a push-button 88 and stud 90. The pawl 86, push-button 88, stud 90, and the biasing spring 92 are carried by the body 18. Intermediate the series 82 and 84 is an indexing mark 94. Upon assembly of the chuck 10, it is necessary to ascertain that the engaging tooth of the pawl 86 is aligned with the mark 94. Upon the hub 12 being rotated in the counterclockwise direction, relative to the body 18, the pawl 86 and series 84 will fix the setting of the hub 12 against inadvertent release therefrom. Clearly, rotation of the hub, relative to the body 18, in the clockwise direction will cause the pawl 86 and series 82 to secure the hub 12 in its selected setting.

Final locking of the chuck 10 against a workpiece is accomplished, in either function thereof, by use of a spanner wrench. Accordingly, for the purpose, spanner wrench holes 96 are formed in the periphery of the outer surface of the body 18. With wrench lugs engaged in the holes 96, and the hub 12 being held by the spindle of a lathe, it remains only to use the wrench to torque the jaws 32 (or jaws with extenders 68) firmly against a workpiece.

Notwithstanding the safety feature provided by the ratcheting arrangement priorly described, my chuck 10 has an additional means for securing the workpiece firmly therewithin. A set screw 98 is threaded into the body 18, and extends through the bore 100 therefor to the surface 76 of the hub 12. By turning the set screw firmly against the hub 12, the body 18 and hub 12 are secured against any relative motion therebetween.

Mounting of the chuck 10 in a lathe is probably evident from the figures, however, I cite the bore 102 in the hub 12. The bore 102 is threaded for its engagement with a lathe spindle, and the flats 104, formed in opposite sides of the hub 12, receive a wrench to fasten the hub securely to the spindle.

Figure 6:
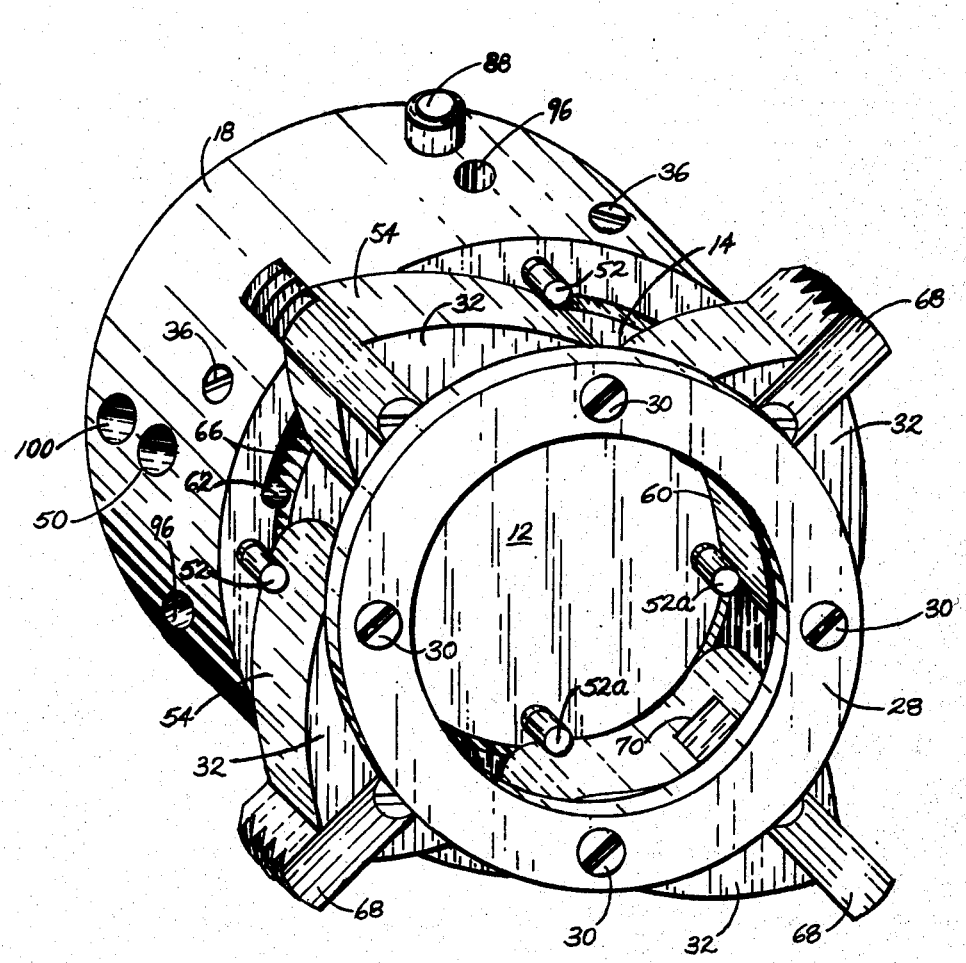
FIG. 6 is an oblique view of the novel, jawed, lathe chuck, according to an alternative embodiment thereof, the same having four jaws.

While I have described by invention in connection with a specific embodiment thereof, it is to be clearly understood that this is done only by way of example, and not as a limitation to the scope of my invention as set forth in the objects thereof and in the appended claims. For example, I disclose my invention in connection with a three-jaw clutch 10. Now, clearly, it will be readily feasible to fashion a four-jaw chuck, and as is shown in FIG. 6, or a chuck with any desired number of jaws, by taking teaching from my disclosure. Also, in lieu of the pin 62 and recesses 64 and 66, other equally facile means can be employed to delimit the slue or rotation of the elements of the clutch. These and all other modifications and/or variations of the clutch 10 are deemed to be within the ambit of my invention and comprised by the claims.

I claim:

1. A jawed, lathe chuck, comprising:
 a hub;
 a jaw carrier, having a plurality of equally-spaced apart jaws pivotably coupled thereto; and
 a chuck body; wherein
 said hub is journalled in said jaw carrier for accommodating relative rotation between said hub and said jaw carrier; and
 said jaw carrier is journalled in said body for accommodating relative rotation between said jaw carrier and said body; and further including
 means carried by said hub, and engageable with said jaws, for causing said jaws to pivot, upon said hub and jaw carrier executing relative rotation therebetween;
 means carried by said body, and engageable with said jaws, for causing said jaws to pivot, upon said jaw carrier and said body executing relative rotation therebetween; and means mounted in said jaw carrier, and engageable with said hub and said body, selectively operative in a first mode for prohibiting relative rotation between said hub and said jaw carrier, and selectively operative in a second mode for prohibiting relative rotation between said jaw carrier and said body.

2. A jawed, lathe chuck, according to claim 1, wherein:
said hub has a recess formed in an outer surface thereof which defines an interface with an inner surface of said jaw carrier;
said body has an opening formed therein and therethrough from an outer surface thereof to an inner surface thereof which defines an interface with an outer surface of said jaw carrier; and
said rotation-preventing means is movable into said recess, and into said opening, to cause said hub and said jaw carrier to be locked together, and to cause said jaw carrier and said body to be locked together, respectively.

3. A jawed, lathe chuck, according to claim 2, wherein:
said jaw carrier has a threaded hole formed therein and therethrough from said inner surface thereof to said outer surface thereof; and
said rotation-preventing means comprises a threaded fastener threadedly engaged with said threaded hole.

4. A jawed, lathe chuck, according to claim 3, wherein:
said threaded hole has a given length; and
said fastener has a length greater than said given length.

5. A jawed, lathe chuck, according to claim 3, wherein:
said threaded fastener has a drive head, engageable by a tool for threadedly turning said fastener in said threaded hole; and
said opening in said body comprises a means for providing access to said drive head, by a tool, for threadedly turning said fastener (a) to move the latter into said opening, or (b) to move the fastener into said recess.

6. A jawed, lathe chuck, according to claim 1, wherein:
said jaw carrier has a circumferential groove formed in an outer surface thereof which defines an interface with an inner surface of said body; and
said body has replaceable key means, projecting inwardly from said inner surface thereof, which engages said groove to retain said body and jaw carrier is rotatable engagement.

7. A jawed, lathe chuck, according to claim 6, wherein:
said key means comprises a plurality of equally-spaced apart threaded fasteners in penetration of said body, from an outer surface of said body to to said inner surface thereof, having inwardly-projecting ends which engage said groove.

8. A jawed, lathe chuck, according to claim 1, wherein:
said jaw-pivot-causing means carried by said hub comprises a plurality of equally-spaced apart, upstanding, drive pins; and
said jaws have camming surfaces engageable with said pins.

9. A jawed, lathe chuck, according to claim 8, wherein:
said jaw carrier has a centrally-disposed void formed therein;
said jaw carrier further has a frame peripherally disposed about said void;
said jaws are pivotably coupled to said frame, and have pendant ends which are pivotably movable into said void, and outwardly of said frame;
said camming surfaces of said jaws comprise lateral surfaces thereof which, upon said pendant ends being moved into said void, move into proximity to each other; and
said drive pins protrude into said void and, upon said hub and said jaw carrier executing relative rotation therebetween, move contactingly along said lateral surfaces and cause said pendant ends to move outwardly relative to said void.

10. A jawed, lathe chuck, according to claim 9, wherein:
said camming surfaces of said jaws further comprise tracks formed in said jaws, in surfaces thereof normal to said lateral surfaces; and
said drive pins are engageable with said tracks.

11. A jawed, lathe chuck, according to claim 1, wherein:
said jaw-pivot-causing means carried by said body comprises a plurality of equally-spaced-apart, upstanding, drive pins; and
said jaws have camming surfaces engageable with said pins.

12. A jawed, lathe chuck, according to claim 11, wherein:
said jaw carrier has a centrally-disposed void formed therein;
said jaw carrier further has a frame peripherally disposed about said void;
said jaws are pivotably coupled to said frame, and have pendant ends which are pivotably movable into said void, and outwardly of said frame;
said camming surfaces of said jaws comprise lateral surfaces thereof which, upon said pendant ends being moved outwardly of said frame, lie substantially tangential to said frame; and
said drive pins protrude in immediate adjacency to an outer surface of said frame and, upon said jaw carrier and said body executing relative rotation therebetween, move contactingly along said lateral surfaces and cause said pendant ends to move inwardly relative to said void.

13. A jawed, lathe chuck, according to claim 12, wherein
said camming surfaces of said jaws further comprise tracks formed in said jaws, in surfaces thereof normal to said lateral surfaces; and
said drive pins are engageable with said tracks.

14. A jawed, lathe chuck, according to claim 10, wherein:
said drive pins and said tracks comprise means cooperative, upon said hub and jaw carrier executing relative rotation therebetween in opposite directions, to move said pendant ends inwardly and outwardly relative to said void.

15. A jawed, lathe chuck, according to claim 13, wherein:
said drive pins and said tracks comprise means cooperative, upon said jaw carrier and said body executing relative rotation therebetween in opposite directions, to move said pendant ends inwardly and outwardly relative to said frame.

16. A jawed, lathe chuck, according to claim 1, wherein:
said jaw carrier has a centrally-disposed void formed therein;
said jaw carrier further has a frame peripherally disposed about said void;
said jaws are pivotably coupled to said frame, and have pendant ends which are pivotably movable into said void and outwardly relative to said frame; and
said jaws have auxiliary extenders replaceably coupled thereto for orientation thereof, selectively, inwardly toward said void, and outwardly away from said void.

17. A jawed, lathe chuck, according to claim 1, wherein:
said hub has a circular extension;
said extension is journalled in said body within an aperture formed in said body;
said extension and aperture defining a relative rotary interface therebetween; and
means fixed to said body and cooperative with said extension for selectively arresting said body and said extension is given, relative rotary dispositions therebetween.

18. A jawed, lathe chuck, according to claim 17, wherein:
said extension has an external surface in which are formed a series of discontinuities; and
said body has means coupled thereto, and extending from said aperture toward said external surface, for arrestingly engaging said discontinuities.

19. A jawed, lathe chuck, according to claim 18, wherein:
said discontinuities comprise serrations; and
said discontinuities-engaging means comprises a resiliently-biased pawl.

* * * * *

UNITED STATES PATENT AND TRADEMARK OFFICE
CERTIFICATE OF CORRECTION

PATENT NO. : 4,398,733

DATED : Aug. 16, 1983

INVENTOR(S) : Thomas C. Mosley, Jr.

It is certified that error appears in the above—identified patent and that said Letters Patent is hereby corrected as shown below:

In column 5, line 54 (claim 6, line 9),
 "is" is changed to -- in -- ; and
in column 8, line 7 (claim 17, line 10),
 "is" is changed to -- in -- .

Signed and Sealed this

Sixth Day of December 1983

[SEAL]

*Attest:*

*Attesting Officer*

GERALD J. MOSSINGHOFF

*Commissioner of Patents and Trademarks*